April 27, 1965 D. H. WEINSTEIN 3,181,030

CIRCUIT CONTROL MEANS

Filed March 13, 1961 3 Sheets-Sheet 1

David H. Weinstein
INVENTOR.

BY Ray L. Smith
ATTORNEY

CIRCUIT CONTROL MEANS

Filed March 13, 1961

David H. Weinstein
INVENTOR.

BY Ray L. Smith
ATTORNEY

April 27, 1965 D. H. WEINSTEIN 3,181,030

CIRCUIT CONTROL MEANS

Filed March 13, 1961 3 Sheets-Sheet 3

David H. Weinstein
INVENTOR.

BY

Ray L. Smith
ATTORNEY 3,181,030

CIRCUIT CONTROL MEANS

David H. Weinstein, Houston, Tex.

Filed Mar. 13, 1961, Ser. No. 95,110
11 Claims. (Cl. 317—9)

This invention relates to circuit control means and more particularly to such means wherein a critical voltage circuit component is utilized to modify circuitry when a predetermined condition has developed in mechanisms or devices with which the control means is used.

Systems heretofore used for opening an electric circuit, or otherwise modifying the circuitry, upon the occurrence of predetermined abnormal conditions in associated devices, have been subject to various undesirable operating conditions such as lack of accuracy, instability, and insensitivity to small variations in the electrical conditions of loading in associated devices. Also, such equipment is usually subject to such influences as temperature change, humidity changes, and the like, either singly or in combination.

It is the primary object of the present invention to provide circuit control means which eliminates the disadvantages of prior art devices as above set forth.

Another object is to provide circuit control means which is simple in construction and which is inexpensive to produce and to maintain.

A further object is to provide circuit control means which is independent of any external source of actuating energy.

A still further object is to provide circuit control means which may be used on devices using either a single or a polyphase source of energy.

It is also an object to provide means for producing an electromotive force in accordance with conditions within a circuit with which the invention is used, and critical voltage means operable by the application of such electromotive force to open, or otherwise modify, the circuit when a predetermined condition develops in the circuit.

The invention also contemplates, in one form, the utilization of a source of radiant energy of the type capable of emitting a beam of radiant energy when a predetermined electromotive force is applied thereto and means operable thereby for opening an electric circuit, or otherwise modifying the circuitry.

Other objects and advantages of the invention will be more fully apparent from the following description and the accompanying drawings in which.

Figure 1:
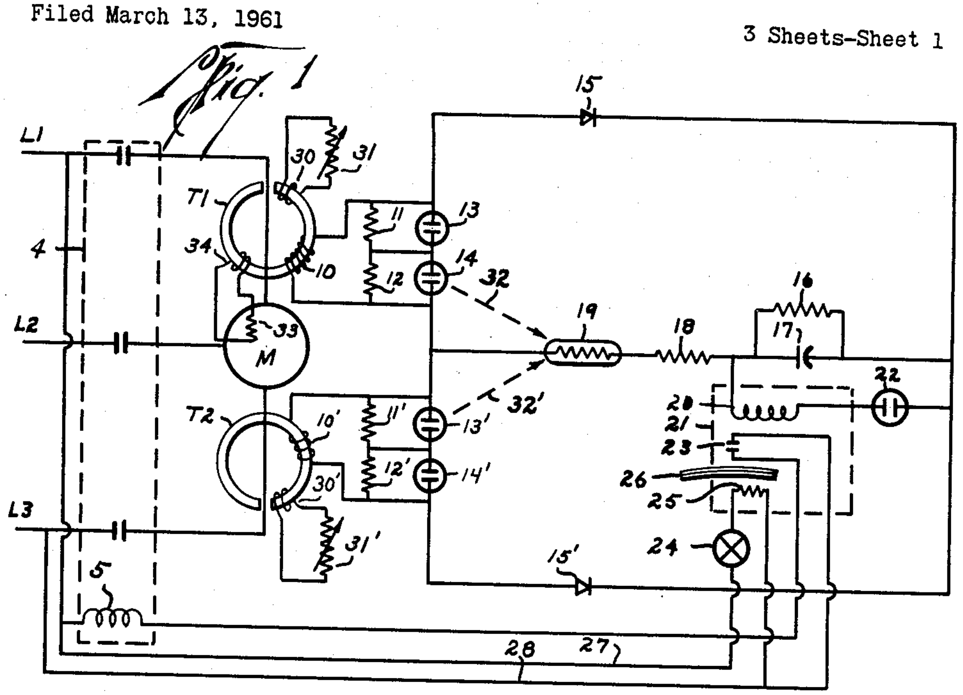
FIG. 1 is a schematic diagram showing one form of my invention as embodied in circuit opening means.

The invention is shown in the drawings and described hereinafter as used with a load on a power line and operable upon predetermined conditions of loading to open the circuit and protect the load from excessive current. Although the invention is described in this particular environment it is to be understood that the invention has a broader application as means for effecting desired circuit control when a predetermined condition develops in a portion of the circuitry, or equipment, with which the control means is used.

To illustrate the invention reference is made to FIG. 1 of the drawings which shows a motor M, or other load, supplied with electrical energy from a power line L1, L2, L3 through a circuit breaker 4 having holding solenoid 5 which is normally energized from the power line to keep the load circuit closed.

Current transformers T1, T2 are shown connected in lines L1 and L3. While two transformers may be used, as shown, it will be obvious from the further description that one or more such transformers may be used.

The secondary 10 of the transformer T1 is connected across series resistors 11, 12 and two radiant energy sources of the type capable of producing a radiant energy when a predetermined electromotive force is applied across their respective terminals. These radiant energy sources are shown as neon lamps 13, 14, although it is to be understood that any component or device may be used so long as it is capable of performing the desired function as indicated. Also across the secondary terminals of the transformer is a series circuit comprising a rectifier 15, multiple resistor 16 and capacitor 17, resistor 18 and a photoconductive cell 19.

In parallel with the resistor-capacitor 16, 17 is the solenoid 20 of relay 21, this holding coil being in series with a neon lamp 22 or similar critical conductor component. The contacts 23 of the relay 21 are moved to closed position when reset button 24 is pressed so that current flows from lines L1, L3 through conductor 27, 28 to heater element 25 which elevates the temperature of bimetallic element 26. Resulting deflection of the element 26 functions to move the contacts 23 to closed position so that the circuit through solenoid 5 is normally closed and the circuit breaker 4 is held in closed position when the motor M is in operation.

It is to be noted that the secondary circuit of transformer T2 is identical to that of the transformer T1 whose elements which are in common are identified in the drawings by like primed reference characters.

To explain the operation of the circuit control means of the invention, as thus far described, we will consider only the current in the line L1 which passes through the transformer T1. The secondary of the transformer is wound with enough turns that if protective actuation is desired at, say ten amperes in the transformer primary, the secondary voltage will be sufficient to light the neon lamps 13, 14. Such ignition voltage is quite accurate and the units are stable and temperature independent. The resistors 11, 12 contribute to this stability.

The transformer T1 is also provided with a secondary winding 30 having variable resistor 31 connected across its terminals. This resistor may be adjusted so that setting may be had for precise loading of the transformer at which the neon lamps 13, 14 will be lighted.

The neon lamp 14 is so located that radiant energy therefrom will strike the photoconductive cell 19 as indicated by the arrow 32. Preferably the neon lamp 13 is located at a panel or control board so that, when lighted, it indicates that an overload has occurred and that the operator's action is required to restore equipment to normal operating conditions.

When the neon lamp 14 glows and radiant energy therefrom impinges upon the photoconductor cell 19, the cell becomes relatively conductive and alternating current energy from the secondary of the transformer T1 is rectified by the rectifier 15 and charging of the capacitor 17 begins. The charging time is determined by the resistor 18 and such time is decreased by large overcurrents in the line L1.

When the voltage on capacitor 17 becomes high enough, for example 100 volts D.C., the neon lamp 22 functions to permit discharge of the capacitor through the solenoid 20 of the relay 21. Energization of the solenoid 20 causes the contacts 23 to be moved to open position thereby opening the circuit through solenoid 5 whereby the circuit breaker 4 is opened. The reset, as is well known in the art, is so interconnected in the relay circuit that once the contacts 23 are opened the circuit remains open until manual reset is effected.

If it is desired to also protect the field of the motor M against excessive temperature, a suitable resistance wire or thermistor 33 may be juxtaposed to or embedded in the field of the motor and connected to an auxiliary secondary winding 34 of one of the transformers T1, or T2. The rise in field temperature will result in an increase in resistance and will unload the transformer and thus be equivalent to an over-current, whereupon the control means will function in the manner just described.

It will be understood that resistors 31 and 31′ will be adjusted for trip-out at a predetermined current in the associated line, say not more than 10% above normal rated current of the load M. Also, in event of phase failure the increase of current in the remaining legs will result in rapid trip-out since excess overcurrent shortens the charging time of the capacitor 17.

An important feature of the invention as shown in this embodiment resides in the circuit which comprises the resistors 11, 12 and the neon lamps 13, 14. The instant one of the lamps 13 or 14 ignites, the potential drop across that portion of the circuit drops and the potential, or electromotive force, across the remaining portion of the circuit rises whereby the other neon lamp is instantly ignited. This enhances assurance that desired operation will take place. Furthermore, the lamps 13, 14 function as voltage limiters, to protect against excessive voltages the elements in the circuitry comprising the rectifier 15, relay 21 and the photoconductive cell 19.

It should be further noted that the embodiment of the invention as thus far described is independent of any external source of actuating energy. This is an important advantage of the invention although it is to be understood that if, for any reason, it is desirable to utilize a separate source of actuating energy such arrangement comes within the realm of the invention.

Figure 2:
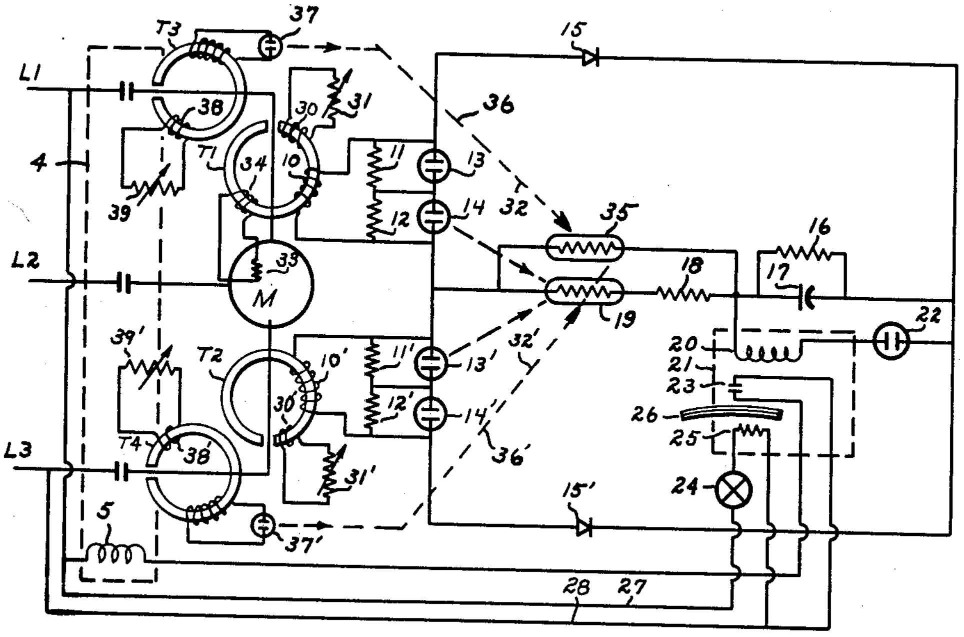
FIG. 2 is similar to FIG. 1 but shows modified circuit opening means.

When starting of the motor M is initiated the heavy starting current will cause the lamps 13, 14 to become temporarily illuminated. Charging of the capacitor 17 is thus initiated but full operation of the motor M, or other load, is completed and the lamps are deenergized before trip-out is effected. If the motor M is large and requires a considerable period of time for starting, the resistor 18 must be of such value that trip-out cannot take place during the starting overload. If, however, a short circuit were to develop in the load M such delay period would permit destruction of the load during the time delay for trip-out. This can be avoided by the modification shown in FIG. 2 in which like parts are given reference characters which are identical to those used in describing FIG. 1. Additionally, the resistor 18 and photo-conductive cell 19 are shunted by a photoconductive cell 35 which is so located as to receive the beam of radiant energy 36 from either or both of the sources 37, 37′ of supplemental current transformers T3, T4 which are suitably adjusted by secondary windings 38, 38′ and variable resistors 39, 39′. It will be understood that the current transformer T3, T4, or equivalent, will be so designed and adjusted that the radiant energy sources 37, 37′ will be energized to produce the energy beam 36 only in event of load current in excess of normal starting current. In event of such excessive current, trip-out will occur instantly to protect the load.

Figure 3:
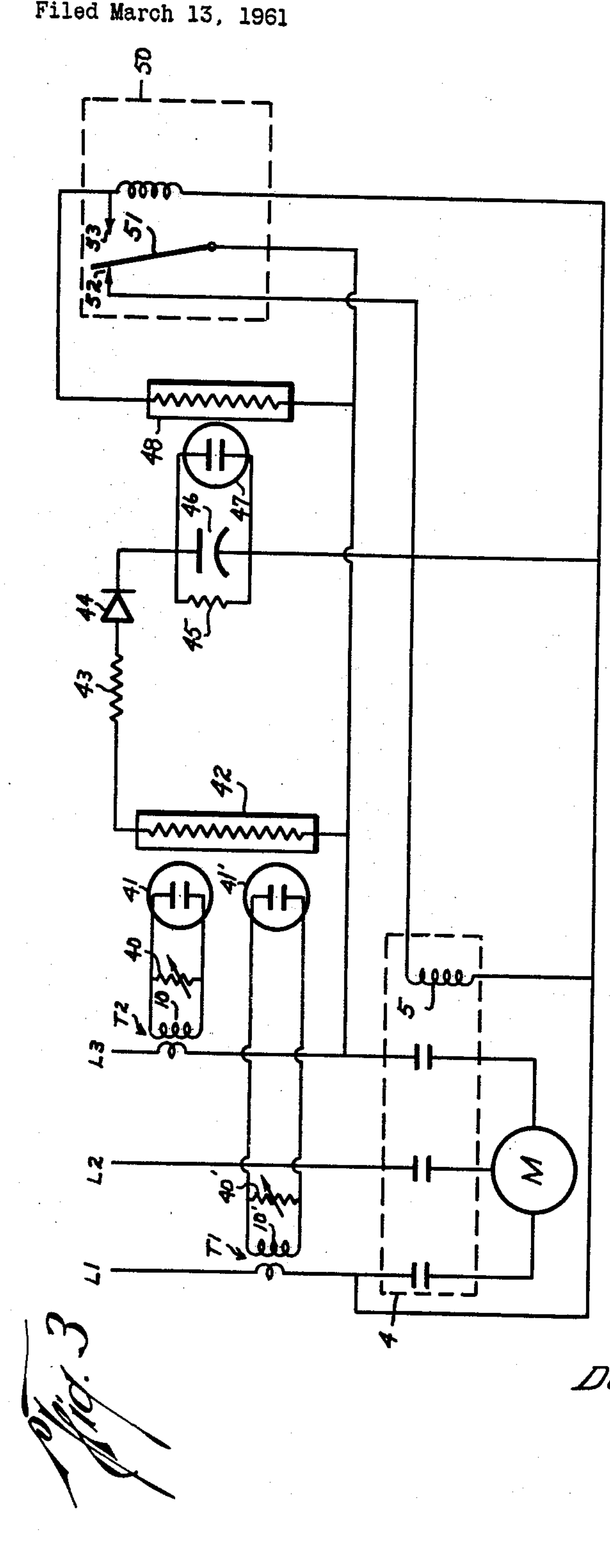
FIG. 3 shows an alternate arrangement for accomplishing the purposes of the invention.

FIG. 3 shows an alternate embodiment of my circuit control means in which the secondaries of the current transformers T1, T2 are shunted by variable resistors 40, 40′ and beam energy sources 41, 41′, shown as neon lights which are so positioned as to have their energy beams impinge upon photo-conductive cell 42 connected to L3 and through resistor 43, rectifier 44 and multiple resistor 45, capacitor 46 and neon lamp 47, to line L1.

The transformers T1, T2 in this embodiment of the invention are so wound that when normal current is flowing in their primaries the voltages at the respective secondary terminals will be high enough to ignite the glow lamps 41, 41′. For example, in a practical case when neon lamps are used, this voltage will be of the order of 80 volts. Now, the variable resistors 40, 40′ are so adjusted that the voltage across the lamps 41, 41′ is just below ignition when normal current is flowing in the lines L1, L3. When the current in either of these lines exceeds the normal value, then one, or both, of the glow lamps will be energized and radiant energy will impinge upon the photoconductive cell 42. This reduces the resistance of the photoconductive cell whereby capacitor 46 begins charging at a rate determined by the value of resistor 43. As previously explained this provides a desired time delay which permits normal motor starting.

When the voltage across the capacitor 46, and hence across the glow tube 47, reaches the point of ignition of the glow tube, the capacitor discharges and a beam of radiant energy impinges upon the photoconductive cell 48. This reduces the resistance of the cell whereupon current flows from L3, through the solenoid 49 of relay 50 and thence to L1. Energized solenoid 49 withdraws the contactor 51 from its normally closed position upon contact 52 and closes upon contact 53. This performs a dual function. It opens the circuit through solenoid 5 of circuit breaker 4 whereby the circuit breaker is opened and the motor M is disconnected from the supply line. At the same time, engagement of the contactor 51 with contact 53 closes a circuit from lines L1 and L3 through the solenoid 49 to form a lockout circuit so that reset is necessary to again initiate operation of the motor M.

Figure 4:
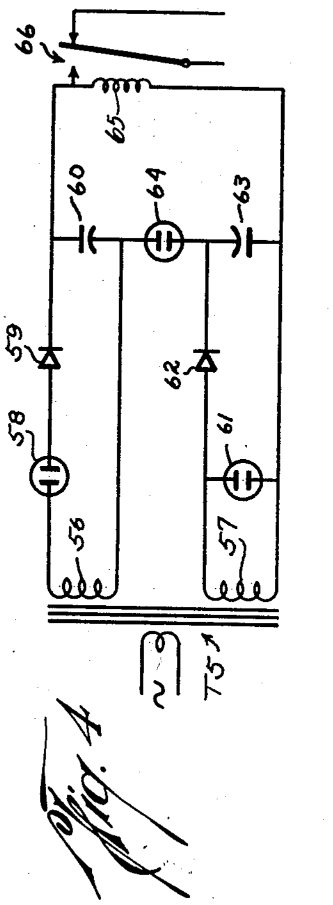
FIG. 4 is a detail showing a segment of circuitry which may be used in the control means of the invention.

Variation of my invention as shown in FIG. 4 comprehends the use of a current transformer T5 in a circuit to be protected whenever, a predetermined current condition develops in such circuit. The transformer T5 has two secondary windings 56, 57 of which the former is connected across series connected glow tube 58, rectifier 59 and capacitor 60. Connected across the terminals of the secondary winding 57 is a similar glow tube 61 and a series connected rectifier 62 and capacitor 63. A glow tube 64 interconnects capacitors 60 and 63. Solenoid 65 of the relay 66 is connected across the terminals of the series connected capacitors 60, 63 and glow tube 64.

Operation of this embodiment is as follows: When there is normal current in the primary of the transformer T5, capacitor 63 is charged to a potential below the ignition point of the glow tube 64. When the load current exceeds normal, then the glow tube 58 begins to conduct and capacitor 60 charges. When the combined potential across the capacitors 60, 63 exceeds the ignition point of the glow tube 64 the stored energy in the capacitors flows through the circuit including the relay coil 65 of relay 66 whereby desired operation of the relay is effected to produce such change in circuitry as may be desired.

Figure 5:
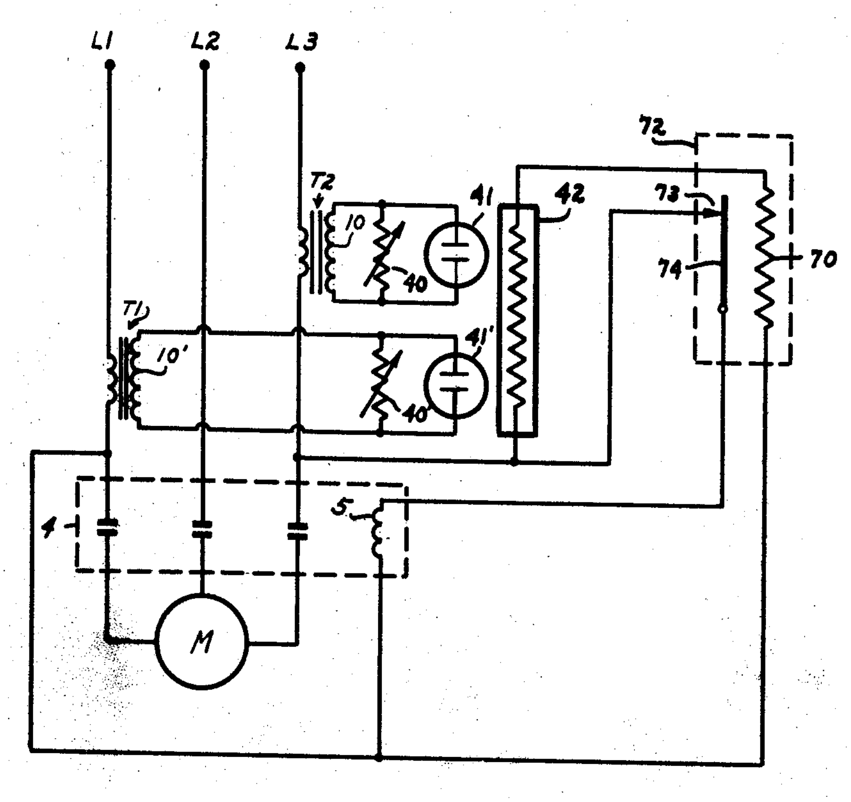
FIG. 5 shows a simplified embodiment of the invention, in which a thermally responsive relay serves to modify the circuit when predetermined conditions have been reached in devices with which the invention is used.

The form of the invention as shown in FIG. 5 is similar to that shown in FIG. 3 but is further simplified in that the photoconductive cell 42 is connected directly to a heater element 70 juxtaposed to bimetallic contactor 71 of relay 72. Thus, if either or both of the cells 41, 41′ ignite, current will flow from L3 through the photoconductive cell and heater element 70 to line L1. The time necessary for sufficient heating of the bimetallic element 71 gives desired time delay before the contactor 71 is withdrawn from its normal engagement with contact 73. Obviously when the circuit is opened at contact 73, solenoid 5 is deenergized and the circuit breaker opens the power line to the motor M.

The above described embodiments of my invention are intended only as characteristic forms of the invention. Individual operating elements or components are merely shown as examples and may be readily replaced by well known equivalents. For example, the various elements responsive to the variable electromotive force at the terminals of a current transformer shown in the illustrative embodiments have been referred to as glow tubes, neon lamps and the like. They may of course be any critical voltage units, such as neon lamps, but need not be so constructed and arranged as to emit a beam of radiant energy except in those combinations where it is necessary that a beam of radiant energy is required to impinge upon a photoconductive cell or where a visible signal is desired to inform an attendant that the circuit control means has been actuated by abnormal conditions in the circuitry in which such means is a part. Similarly the photoconductive cell, shown as 19, 35, 42 and 48 may take on various forms as long as the desired change in conductive properties is effected from the impinging of a beam of radiant energy thereon. Likewise, the time delay feature provided by resistor 18 or 43 may be furnished through other means such as the heater element 70 in FIG. 5, or may be combined with other components of the combination comprising my invention.

Broady, my invention comprehends a combination circuit control means comprising means responsive to predetermined electromotive force related to circuit conditions, such means being associated with additional means operable by such response to modify the circuitry when a predetermined condition develops within the circuit with which the control means is used.

The invention claimed is:

1. Apparatus for supervising the condition of a circuit, comprising means for emitting light in response to the application thereto of a triggering electromotive force as great as a critical breakdown voltage, means for sensing the current in said circuit and for applying said electromotive force to said light-emitting means when the current in said circuit reaches a predetermined magnitude, photosensitive means for receiving said light and for producing a corresponding output, and means responsive to said output for opening said circuit.

2. The apparatus of claim 1, said current sensing means comprising a current transformer, said light-emitting means comprising a gaseous discharge lamp connected to said transformer.

3. The apparatus of claim 1, said current sensing means comprising a current transformer having means for adjustably loading said transformer to vary the output of said transformer for a given input current magnitude.

4. The apparatus of claim 1, said current sensing means comprising a current transformer, and temperature-sensing means for variably loading said transformer.

5. The apparatus of claim 1, said current sensing means comprising a current transformer, said light-emitting means comprising a neon lamp, said transformer having an output winding connected to said lamp.

6. The apparatus of claim 5, further comprising another neon lamp connected in series with the first-mentioned lamp across said winding, each of said lamps being shunted by a resistor.

7. The apparatus of claim 1, said photosensitive means comprising a photoconductive cell, said means responsive to said output comprising a time delay circuit including a condenser charged by current through said cell.

8. The apparatus of claim 1, said circuit having plural current-carrying conductors, said current sensing means comprising a corresponding plurality of current transformers coupled to said conductors, respectively, said light-emitting means comprising a corresponding plurality of light-emitting devices coupled to said transformers respectively, and each arranged to illuminate said photosensitive means.

9. The apparatus of claim 1, said output of said photosensitive means being coupled to said circuit opening means by time delay means, and additional means for opening said circuit relatively instantaneously in response to a current in said circuit of predetermined magnitude.

10. The apparatus of claim 9, said additional means comprising additional critical breakdown voltage light-emitting means responsive to the current in said circuit and additional photosensitive means responsive to said additional light-emitting means.

11. Apparatus for supervising a circuit, comprising means for producing light in response to the application thereto of a critical threshold voltage, photosensitive means for receiving said light and producing an output indicative of a condition to be sensed in said circuit, and means for sensing said condition in said circuit and thereupon applying said critical threshold voltage to said light-emitting means.

References Cited by the Examiner

UNITED STATES PATENTS

| | | | |
|---|---|---|---|
| 1,736,993 | 11/29 | Breisky | 317—9 |
| 2,057,472 | 10/36 | Bonds | 317—9 |
| 2,090,619 | 8/37 | Biach et al. | 317—151 X |
| 2,096,916 | 10/37 | Pook | 317—151 X |
| 2,554,800 | 5/51 | Steiner | 317—124 |
| 2,920,242 | 1/60 | Koss | 317—52 |
| 2,967,981 | 1/61 | Wise | 317—124 |

SAMUEL BERNSTEIN, *Primary Examiner.*

WALTER L. CARLSON, *Examiner.*